United States Patent [19]  
Cobb

[11] 3,855,267  
[45] Dec. 17, 1974

[54] ALUMINUM PHOSPHATE-PROMOTED CATALYSTS FOR THE AMMONIALYTIC CLEAVAGE OF LACTAMS

[75] Inventor: Raymond L. Cobb, Bartlesville, Okla.

[73] Assignee: Phillips Petroleum Company, Bartlesville, Okla.

[22] Filed: Aug. 31, 1973

[21] Appl. No.: 393,494

Related U.S. Application Data

[63] Continuation-in-part of Ser. No. 859,555, Sept. 19, 1969, abandoned.

[52] U.S. Cl............ 260/465.2, 260/464, 260/465 B
[51] Int. Cl.................... C07c 121/12, C07c 121/02
[58] Field of Search............... 260/465.2, 465 B, 464

[56] References Cited
UNITED STATES PATENTS

| | | | |
|---|---|---|---|
| 2,234,566 | 3/1941 | Lazier et al. | 260/465.2 |
| 2,375,005 | 5/1945 | Kung | 260/465.2 |
| 2,900,310 | 8/1959 | Ottenheym | 260/465.2 X |
| 3,036,113 | 5/1962 | Ottenheym | 260/465.2 |
| 3,555,059 | 1/1971 | Schwarz et al. | 260/465.2 |
| 3,567,757 | 3/1971 | Ida et al. | 260/465.2 |
| 3,579,558 | 5/1971 | Immel et al. | 260/465.2 |

FOREIGN PATENTS OR APPLICATIONS

| 1,557,950 | 1/1969 | France | 260/465.2 |
|---|---|---|---|

*Primary Examiner*—Joseph P. Brust

[57] ABSTRACT

The ammonialytic cleavage of lactams to $\omega$-aminonitriles is effectively promoted by the use of aluminum phosphate-promoted catalysts. The combination of aluminum phosphate with aluminas, silicas, mordenites, or molecular sieves results in catalysts particularly effective for the conversion of lactams to $\omega$-aminonitriles.

9 Claims, No Drawings

ALUMINUM PHOSPHATE-PROMOTED CATALYSTS FOR THE AMMONIALYTIC CLEAVAGE OF LACTAMS

This is a continuation-in-part of copending application Ser. No. 859,555, filed on Sept. 19, 1969, and now abandoned.

This invention relates to the production of ω-aminonitriles from the corresponding lactams. In another aspect, it relates to catalysts for ammonialytic cleavage of lactams to ω-aminonitriles.

Lactams are internal or cyclic amides. The reaction involved with the catalysts of my invention converts the lactam to an ω-aminonitrile by a cleavage reaction with ammonia. The reaction involves removal of the oxygen from the lactam molecule with the formation of water, and the addition of another nitrogen to the molecule, thus forming a nitrile group on one end of a chain-like molecule with an amino group on the other end. There can be various substituents along the chain.

The ω-aminonitriles are valuable chemicals since they are readily convertible to diamines or to other compounds useful as polymer precursors. For example, the commercially available nylons are essentially linear long chains of amide

groups separated by 4 to 11 methylene

groups. One basic method of preparation of such nylons is by condensing the diamines with dibasic acids, for example, hexamethylenediamine with adipic acid.

It is desirable to obtain maximum conversion of lactam to the corresponding ω-aminonitrile, in order to have commerciably feasible production.

It is an object of my invention to provide catalysts effective to improve the ammonialytic cleavage of lactams to ω-aminonitriles.

Another object is to provide for maximum effectiveness in one or more of productivity and selectivity in the conversion of lactams to ω-aminonitriles through the use of proper catalysts.

Other aspects, objects, and the several advantages of my invention will be apparent to one skilled in the art from the following description and from my appended claims.

I have discovered that combining aluminum phosphate with materials such as alumina, silica, alkaline earth silicates, complex silicates such as mordenites, molecular sieves, and the like, provides unique and peculiarly effective catalysts which I have applied to the conversion of lactams to ω-aminonitriles. These catalysts provide improved productivity and improved selectivity for ammonialytic cleavage under quite moderate reaction conditions.

The ammonialytic cleavage reaction to which I have referred can be illustrated by the following:

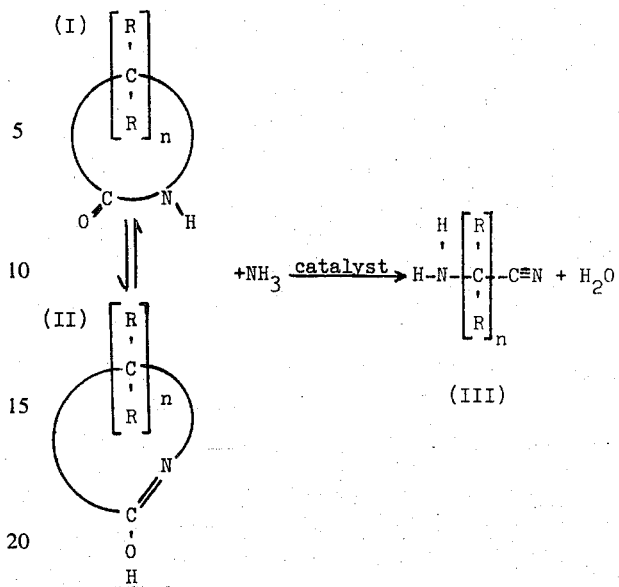

The lactam as shown by formula (I) above is called a lactim in the tautomeric or enol form as shown by formula (II) above. The reaction, perhaps, may be more readily visualized as being between the enol form and the ammonia. Whether the cleavage is considered as occurring on one side or the other of the nitrogen of the lactam is immaterial. The resulting noncyclic ω-aminonitrile is represented by formula (III) above. As indicated by the R symbols in the formulas given, there can be various substituents on the carbons of the lactam ring, and consequently along the ω-aminonitrile carbon chain as shown in formula (III) above. R can be hydrogen, alkyl, cycloalkyl, aryl, or combinations thereof such as alkaryl or aryalkyl and the like, having in the range of from 1 to about 8 carbon atoms, provided that not more than 10 carbon atoms are contained in the total of R groups per lactam molecule. The n is an integer, and can range from 3 to 9 inclusive.

The examples which follow demonstrate the operability and effectiveness of the catalysts as I apply them to the ammonialytic cleavage reaction according to the process of my invention. These examples should be considered illustrative and not limiting. The examples which follow represent a series of runs with varying catalysts and with varying reaction temperates. The evaluation of the results of these runs was made with the aid of analysis by gas-liquid chromatography. With this procedure the chromatographic peaks corresponding to reactants and products were identified and compared with one another on the basis of area percent, the area for each effluent constituent being defined by the base line of the chromatographic curve and the chromatographic peak for that constituent. While area percent is not necessarily identical with either weight percent or mole percent, it is, nevertheless, a commonly used and reliable method for comparing the relative effects of reaction variables, such as different catalysts, within a given reaction system.

In the examples, conversion is determined by subtracting the area percent of lactam in the effluent from the catalyst-containing reactor based on the total area for the effluent, excluding ammonia, from 100. Stream selectivity is determined by calculating the area percent of the desired ω-aminonitrile in the effluent from the reactor based on the total area for the effluent, excluding ammonia and lactam.

During each run, the stream from the catalyst-containing reactor was periodically subjected to gas liquid chromatography. A lack of a peak for the original lactam showed complete conversion. the gas liquid chromatography peak for ω-aminonitrile determined the area percent of ω-aminonitrile in the stream portion made up of the ω-aminonitrile plus unsaturated nitrile.

A series of products is formed in the ammonialytic cleavage of a lactam. These include the desired ω-aminonitrile, a series of minor amounts of intermediates of an unsaturated type which can be represented by

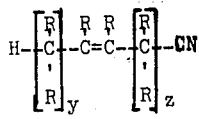

wherein y and z are integers such that $y + z + 2 = n$, as well as unconverted lactam, ammonia, diluent if any is used, and sometimes minor amounts of polymer. No polymer was formed, however, in any runs in the following examples. Where a diluent is used, the diluent is excluded in calculating conversion and stream selectivity.

EXAMPLE I

My catalysts for the several runs of this example were prepared by making up a saturated solution of aluminum phosphate $AlPO_4$ in boiling deionized water. While only slightly soluble in water, aluminum phosphate does have a solubility sufficient to produce effective catalysts as shown by data summarized. In Table I.

To be certain that a saturated solution was obtained, an excess of aluminum phosphate crystals was maintained in the bottom of the dissolving vessel. The saturated solution then was separated from the excess crystals by decanting. One hundred fifty (150) parts by weight of a substrate were stirred into 1,200 parts by weight of the decanted, hot, saturated, aluminum phosphate solution. The total admixture was then stripped under vacuum at about 100° C. by means of indirect heat in order to remove all volatile components including moisture, resulting, then, in a dried solid-particle catalyst.

The dried catalysts for the several runs comprised aluminum phosphate combined with various substrates. The catalysts of my invention were utilized in runs 1, 3, 5, and 7. Comparative runs were made using either aluminum phosphate alone or substrate alone with the results shown in control runs 2, 4, 6, 8 and 9.

For each run, caprolactam, normally a solid material, was heated to a temperature of about 130° C. and so converted to a molten or liquid state. The lactam was maintained at this temperature in the molten condition while ammonia gas was passed through the molten material. The ammonia gas was at one atmosphere of pressure and preheated to about 375° C. prior to contacting the molten lactam, and was passed through the caprolactam at the rate of 1.9 g (gram) per minute.

The vaporous effluent from this procedure was a mixture of ammonia and caprolactam vapor, and contained in the range of about 75 to 100 moles of ammonia per mole of lactam. This vapor stream was then conducted to a stainless steel reactor of 1 inch diameter containing about 100 cc of catalyst.

The temperature of the reactor was controlled and varied by an electric furnace in which the reactor was contained. Thus, for each catalyst tested, the stream of ammonia and lactam vapor mixture was passed through the catalytic reactor for about 20–30 minutes, the reaction temperature was noted, and the reactor effluent was sampled for analysis by gas-liquid chromatography. This process was repeated for several reaction temperatures, samples being taken at about 275°, 300°, 330°, 360°, 400°, and 425°C. The conversion and selectivity results obtained with each catalyst in such a temperature series were plotted on a graph as a function of reaction temperature. To compare the effectiveness of the catalysts, the conversion and selectivity were read from each curve at a point corresponding to 375°C. reaction temperature. These standardized and directly comparable data so obtained from the series of reactions are shown in Table I below.

Table I

| Run No. | Catalyst | Conversion % | Selectivity % |
|---|---|---|---|
| 1 | γ-Alumina[a] + aluminum phosphate | 87 | 62 |
| 2 | γ-Alumina[a] | 90 | 25 |
| 3 | α-Alumina[a] + aluminum phosphate | 43 | 100 |
| 4 | α-Alumina[a] | 10 | 100 |
| 5 | Zeolon H[b] + aluminum phosphate | 43 | 100 |
| 6 | Zeolon H[b] | 20 | 100 |
| 7 | 13X molecular sieve[c] + aluminum phosphate | 60 | 100 |
| 8 | 13X molecular sieve[c] | 57 | 82 |
| 9 | Aluminum phosphate | 65 | 87 |

[a] The aluminas were tableted aluminas containing 99% $Al_2O_3$, remainder moisture.
[b] Zeolon H (a trademark) is a synthetic molecular sieve or zeolite classified as a mordenite. The material is described as $M_{8/n}.Al_8.Si_{40}.O_{96}.24H_2O$ where M may be sodium, hydrogen, or other exchangeable cation and n has the valence of such cation. The H designation refers to the form where M = hydrogen. The Zeolon H used had a pore size of about 10 A.
[c] The molecular sieves are commercially available zeolite type materials. 13X indicates a pore size of about 10 A units.

The data in Table I above demonstrate clearly that my catalysts, aluminum phosphate plus substrate, are superior to either component alone. Distinct improvement in conversion or in selectivity or in both factors is shown by my catalysts.

Examples of the group of lactams wherein n is in the range of from about 3 to 9 include the following as illustrative examples.

6-Aminohexanoic acid lactam
4-aminobutyric acid lactam
10-aminodecanoic acid lactam
10-amino-3-ethyl-5-octodecanoic acid lactam
4-amino-2-methylbutyric acid lactam
10-amino-3-cyclohexyldecanoic acid lactam
8-amino-4,4-dicyclopentaoctanoic acid lactam
10-amino-6-phenyldecanoic acid lactam
10-amino-4-butyl-6-phenyldecanoic acid lactam
6-amino-3-benzylhexanoic acid lactam
5-amino-4-(3-ethylcyclohexyl)pentanoic acid lactam 7-amino-5-(3,5-dimethylphenyl)heptanoic acid lactam
8-amino-3-(4-ethylcyclohexyl)octanoic acid lactam
8-amino-2,2,4,4,6,6-hexamethyloctanoic acid lactam
9-amino-2-ethyl-3-methyl-6-phenylnonanoic acid lactam 5-amino-pentanoic acid lactam and the like.

The aluminum phosphate utilized in preparing my catalysts can be synthetically prepared from such as $NaAlO_2$ and $H_3PO_4$, for example. The preparation of synthetic aluminum phosphate is described by Becher in the *Handbook of Preparatory Inorganic Chemistry*, G. Brauer, Second Edition, Academic Press, 1963, Vol. 1, page 831. Naturally-occurring aluminum phosphate is suitable. The material occurs widely in nature as the minerals angelite, lucinite, sterretite, and the like. Either crystalline or powdered aluminum phosphate can be utilized in making up the saturated solution, though the powdered material is usually preferable since it more quickly provides the saturated solution desired. Both the water to make up the saturated solution as well as the saturated solution of aluminum phosphate itself are preferably near or at the boiling temperature under prevailing atmospheric pressure, though temperatures close to the boiling point are suitable in the range of from about 180° F. to the boiling point.

The aluminum phosphate, the combination of which with a substrate produces my catalysts, is added in the range of from about 0.05 to about 50 weight percent of aluminum phosphate per weight of substrate.

The supports or substrates for the aluminum phosphate include α-alumina, γ-alumina, η-alumina, fluoride compound-treated alumina, and the like. The supports include a silica which can be synthetically prepared, as well as naturally-occurring materials such as sand, quartz, and the like. Such materials preferably are ground to a relatively finely divided state for use as supports. Combinations of alumina and silica, either physically mixed together, or combined as silica-alumina, also are considered to be effective as substrates.

Other silicon-containing materials considered to be useful as substrates include alkaline earth silicates, molecular sieves or zeolites, and closely related materials such as the mordenites.

The alkaline earth silicates are compounds of metals of Group IIA of the Periodic Table of the Elements as it is shown on page B-3 of the *Handbook of Chemistry and Physics*, 49th Edition (1968), the Chemical Rubber Company, Cleveland, Ohio. Specifically, these compounds are silicates of beryllium, magnesium, calcium, strontium and barium. The silicates include orthosilicates, metasilicates, trisilicates, and include hydrated, partly hydrated and anhydrous.

Nonlimiting examples of the silicates of the alkaline earth metals to which I refer are beryllium disilicate $Be_4Si_2O_7(OH)_2$; beryllium orthosilicate $Be_2SiO_4$; magnesium metasilicate $MgSiO_3$; magnesium orthosilicate $Mg_2SiO_4$; calcium α-metasilicate and calcium β-metasilicate $CaSiO_3$; calcium diorthosilicate $Ca_2SiO_4$; calcium trisilicate $Ca_3SiO_5$, sometimes written $3CaO.SiO_2$; strontium orthosilicate $SrSiO_4$; barium metasilicate $BaSiO_3$; and hydrated materials such as $BaSiO_3.6H_2O$; and the like.

While I prefer to use synthetically produced alkaline earth silicates, it is also possible to use the equivalent naturally-occurring materials, nonlimiting examples of which include enstatite $MgSiO_3$; talc $Mg_3Si_4O_{10}(OH)_2$; forsterite $Mg_2SiO_4$; and the like.

Natural or synthetic mixtures or chemically combined alkaline earth silicates, such as diopside $CaMg(SiO_3)_2$ are considered to be effective catalysts also.

I also find effective as substrates the more complex silicates such as the mordenites, a formula of which was given in footnote (b) of Table I hereinabove, and which sometimes is written as $(Na_2K_2Ca)Al_2Si_{10}O_{24}.7H_2O$; attapulgus clay, a hydrated magnesium aluminum silicate based on attapulgite $Mg(Al)_5Si_8O_{22}(OH)_4.4H_2O$; montmorillonite $Al_2o_3.4SiO_2.H_2O$ with many variations, in which generally about one-sixth of the alumina atoms in montmorillonite are replaced by magnesium atoms, and varying amounts of hydrogen, sodium, potassium calcium, and magnesium are loosely combined; and fuller's earth.

The molecular sieves or zeolites to which I refer include any of the materials commonly so termed, such as those known commercially as Type A, Type X, and Type Y, and the term further includes the mordenites. Molecular sieves are particularly described in an article by D. W. Breck in the *Journal of Chemical Education*, Vol. 41, page 678 and following, December, 1964. I specifically incorporate the material of this article for detailed descriptions of molecular sieves in their various types. The following paragraph is included for brief summary reference so as not to unduly lengthen this specification.

Molecular sieves have a three-dimensional interconnecting network structure of silica and alumina tetrahedra. The tetrahedra are formed by four oxygen atoms surrounding a silicon or aluminum cation. Each oxygen has two negative charges and each silicone atom has four positive charges. The trivalency of aluminum causes the alumina tetrahydron to be negatively charged which then requires an additional anion to balance the system. The final structure generally has sodium, potassium, or calcium in the network. These cations are the exchangeable ions of the zeolite or molecular sieve structure. Quadrivalent silicon atoms can be replaced by trivalent aluminum atoms in various ratios which then alters the crystal structure.

All of the substrates as I have described them are solid materials. The particular physical form is not critical, but is chosen according to suitability for a particular reactor. Molecular sieves are commercially available in various physical forms such as granular, 150-inch to 174-inch pellets, beads, and finely divided forms of up to 200 mesh. The alkaline earth silicates, either synthetically produced or naturally-occurring, preferably are used in the form of extrudates formed into pellets or irregular lumps or granules with a particle diameter of from about 3 to about 6 milimeters.

The particular form of the substrate, and hence of the catalyst which is a substrate combined with the aluminum phosphate, whether in pellet or lump or granule or finely divided particle, as to the choice or catalyst particle size, will depend to a large extent on the type of catalyst bed used in the contacting zone with the lactam vapor.

The conversion itself, the ammonialytic cleavage, usually is effected in the gaseous phase. The catalysts are solids. Contacting of the gaseous lactam phase with the solid catalyst can be by any conventional means, such as by passing a gaseous stream of lactam and ammonia through a fixed bed catalyst, or through a fludized bed of catalyst, or otherwise as may be convenient.

Thus, it is necessary, first, to produce a vaporous stream of the lactam. The ammonia portion of the vapor stream can be added as the lactam is vaporized, or added separately after the lactam is vaporized, or added as a gaseous phase to a liquid lactam-diluent solutio. For example, the lactam can be melted into a molten or liquid form and ammonia gas passed therethrough, and the effluent vapors or gases form a stream which is a mixture of ammonia vapor and lactam vapor. This stream is conducted to a contacting or reaction zone where the ammonialytic cleavage is promoted by the catalyst. If desired, the ammonia can be heated before passing through the molten lactam.

Alternatively, the lactam can be dissolved in a suitable solvent, ammonia gas passed therethrough, and the effluent gaseous stream then contains vaporized lactam, plus ammonia vapor, plus vaporized solvent. A more usual procedure is to prepare the lactam-diluent solution or dispersion, admix therewith ammonia gas to form a mixed liquid and gaseous admixture, and conduct this admixture stream to the hot contacting zone containing the catalyst where the liquid is vaporized and ammonialytic cleavage occurs in the vapor state. Vaporization can be effected prior to the contacting zone, if desired.

The reaction temperatures for the ammonialytic cleavage reaction can be in the range of from about 250° to 750° C.; though more preferably in the range of from about 350° to 500° C. Pressures in the range of from about 0.1 to as much as 1,000 atmospheres can be employed in the reaction zone. More usually, the pressures are within the range from about 1 to about 100 atmospheres. Atmospheric pressure is certainly convenient, quite suitable, and therefore frequently employed. The reaction itself can be effected within a range of from about 0.1 second to 10 hours, though usually times of between 1 and about 10 seconds are quite suitable to obtain desired conversion.

While a minimum reaction requirement of 1 mole of ammonia per mole of lactam is required in these reactions, the amount of ammonia actually employed can range from a minimum of 1 to as much as 1,000 moles of ammonia per mole of lactam. Excess ammonia not consumed in the reaction can ultimately be recovered, such as by means of condensation, and recycled for reuse. The upper amount of ammonia permissible to employ is limited primarily by economic considerations as to amounts of materials convenient to handle, recover, and recycle. In practice, somewhat more than the minimum amount of ammonia is normally employed, usually at least 10 moles per mole of lactam, since more effective cleavage is obtained thereby.

Suitable diluents can be utilized to make up as much as 90 weight percent of the total mixture comprised of lactam, ammonia and diluent. Suitable include cyclic hydrocarbons, such as aromatics, including benzene, toluene, xylene, and the like; as well as cyclopentane, cyclohexane, and the like. Cyclic ethers also are suitable and include tetrahydrofuran, tetrahydropyran, and the like. Specifically, any diluent can be employed which is substantially nonreactive within the reaction environment, and which will effectively dissolve or disperse the lactam to be cleaved.

Desirably, diluents are employed which can be subsequently used to azeotrope water from the reaction mixture which will include diluent, unreacted lactam, unused ammonia, the desired ω-aminonitrile, as well as water. Water, of course, is a product of the reaction of the rate of one mole per mole of lactam cleaved.

The ω-aminonitrile produced can be recovered from the reaction mixture by any of means known to the art. U.S. Letters Pat. No. 2,900,310, issued to Johannes H. Ottenheym August 18, 1959, discloses one suitable means of separating the desired ω-aminonitriles.

The foregoing discussion and examples disclose that my catalysts, aluminum phosphate combined with such substrates as alkaline earth silicates and complex silicates, molecular sieves, aluminas, silicas, aluminasilicas, and the like, all are effective to catalyze the ammonialytic cleavage of lactams to the corresponding ω-aminonitriles.

Reasonable variatons and modifications of my invention are possible within the scope of this disclosure without departing from the scope and spirit thereof.

What is claimed is:

1. A method for the conversion of a lactam represented by the formula

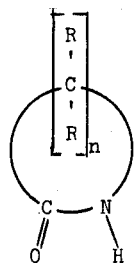

to an ω-aminonitrile represented by the formula

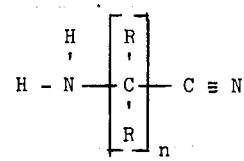

wherein $n$ is an integer of from 3 to 9, and R is selected from the group consisting of hydrogen, alkyl, cycloalkyl, aryl, and combinations thereof, having up to about 8 carbon atoms per R group and a maximum of about 10 carbon atoms in all R groups of said lactam, which comprises contacting said lactam with ammonia under suitable reaction conditions in the presence of a catalyst consisting essentially of aluminum phosphate on a substrate, wherein said substrate is selected from the group consisting of α-alumina and zeolites, said reaction conditions comprising a temperature in the range of about 250° to about 75° C, a pressure in the range of about 0.1 to about 1,000 atmospheres, an ammonia to lactam mole ratio in the range of about 1 to about 1,000. and a time in the range of about 0.1 second to about 10 hours, and said aluminum phosphate being in the range of from about 0.05 to about 50 weight percent on said substrate.

2. A method for the conversion of a lactam to the corresponding ω-aminonitrile which comprises:
 a. converting said lactam to a liquid lactam,
 b. passing a stream of ammonia gas through said liquid lactam and thereby producing a vapor stream comprising ammonia gas and lactam vapor,
 c. contacting said vapor stream under suitable ammonialytic cleavage reaction conditions with a catalyst, said catalyst consisting essentially of aluminum phosphate on a support selected from the group consisting of α-alumina and zeolites, said aluminum phosphate being in the range of about 0.05° to about 50°weight percent based on said support, to thereby convert said lactam to an ω-aminonitrile, said reaction conditions comprising a temperature in the range of about 250 to about 750°C, a pressure in the range of about 0.1 to about 1,000 atmospheres, an ammonia to lactam mole ratio in the range of about 1 to about 1,000, and a time in the range of about 0.1 second to about 10 hours, wherein said lactam is represented by the formula

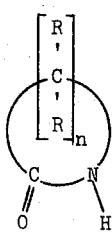

and wherein said ω-aminonitrile is represented by

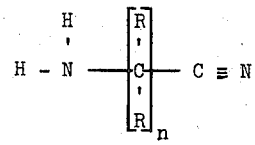

wherein n is an integer of from 3 to about 9, and R is selected from the group consisting of hydrogen, alkyl, cycloalkyl, aryl, and combinations thereof, having up to about 8 carbon atoms per R group and a maximum of about 10 carbon atoms in all R groups of said lactam.

3. The method of claim 2 wherein the said step (a) is a dissolving step wherein is employed a diluent and wherein said lactam is substantially dispersed in said diluent; and wherein in said step (b) said liquid lactam is essentially a dispersion of said lactam in said diluent.

4. The method of claim 3 wherein said diluent constitutes from about 1 to about 90 weight percent of the total of diluent, ammonia, and lactam, and said diluent is essentially nonreactive under the ammonialytic cleavage conditions.

5. The method of claim 4 wherein the said diluent is selected from cyclic paraffinic hydrocarbons, aromatic hydrocarbons, cyclic ethers, mixtures thereof, and wherein said diluent contains from 5 to about 20 carbon atoms per molecule.

6. The method of claim 1 wherein the said lactam is caprolactam and the said catalyst is aluminum phosphate on a support of α-alumina.

7. The method of claim 1 wherein said lactam is caprolactam and said catalyst is aluminum phosphate on a support of zeolite.

8. The method of claim 1 wherein said lactam is caprolactam and said catalyst is aluminum phosphate on a zeolite having a pore size of about 10 A units.

9. The method of claim 1 wherein said lactam is caprolactam and said catalyst is aluminum phosphate on 13X molecular sieve.

* * * * *

UNITED STATES PATENT AND TRADEMARK OFFICE
CERTIFICATE OF CORRECTION

PATENT NO. : 3,855,267
DATED : December 17, 1974
INVENTOR(S) : Raymond L. Cobb

It is certified that error appears in the above–identified patent and that said Letters Patent are hereby corrected as shown below:

Column 8, claim 1, line 50, "75° C" should be --- 750° C ---; Column 9, claim 2, line 4, "0.05° to about 50° weight percent" should be --- 0.05 to about 50 weight percent ---.

Signed and Sealed this

Twelfth Day of April 1977

[SEAL]

Attest:

RUTH C. MASON
*Attesting Officer*

C. MARSHALL DANN
*Commissioner of Patents and Trademarks*